(12) United States Patent
Cao (10) Patent No.: US 10,506,021 B2
(45) Date of Patent: Dec. 10, 2019

(54) METHOD AND DEVICE FOR PROVIDING COMMUNICATION CONNECTION FOR A PLURALITY OF CANDIDATE APPLICATIONS IN A MOBILE DEVICE

(71) Applicant: Baidu Online Network Technology (Beijing) Co., LTD., Beijing (CN)

(72) Inventor: Haitao Cao, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 300 days.

(21) Appl. No.: 14/412,295

(22) PCT Filed: Jul. 23, 2013

(86) PCT No.: PCT/CN2013/079921
§ 371 (c)(1),
(2) Date: Dec. 31, 2014

(87) PCT Pub. No.: WO2014/015795
PCT Pub. Date: Jan. 30, 2014

(65) Prior Publication Data
US 2015/0172371 A1    Jun. 18, 2015

(30) Foreign Application Priority Data
Jul. 23, 2012  (CN) .......................... 2012 1 0257090

(51) Int. Cl.
*G06F 15/16* (2006.01)
*H04L 29/08* (2006.01)
(Continued)

(52) U.S. Cl.
CPC ............ *H04L 67/10* (2013.01); *G06F 9/5027* (2013.01); *H04L 67/04* (2013.01); *H04L 67/32* (2013.01); *H04W 4/00* (2013.01)

(58) Field of Classification Search
CPC ......... H04L 67/10; H04L 67/04; H04L 67/32; G06F 9/5027; H04W 4/00
(Continued)

(56) References Cited

U.S. PATENT DOCUMENTS 7,860,923 B2 * 12/2010 Singer ................. H04L 63/0823
                                                        709/203
8,730,845 B2 *  5/2014 Byrne ................... H04W 88/06
                                                        370/255
(Continued)

FOREIGN PATENT DOCUMENTS

CA         2403813       10/2001
CN        101167327       4/2008
(Continued)

*Primary Examiner* — Krisna Lim
(74) *Attorney, Agent, or Firm* — Nixon Peabody LLP (57) ABSTRACT

A mobile device for providing a communication connection for candidate applications comprises an application-obtaining module, an application-selecting module, and a communication-providing module. The application-obtaining module obtains candidate applications to be provided communication connection in the mobile device. At least one of the candidate applications includes a communication module for providing communication connection. The application-selecting module is configured to select a target connected-application from among the candidate applications based on application-related information of the candidate applications. The target connected-application includes the communication module. The communication-providing module is configured to enable the communication module of the target connected application so as to provide communication connection for the candidate applications. The application-related information includes any combination of communication demand information of the candidate applications, communication protocol information of the communication modules of the candidate applications, and (Continued)

application classification information of the candidate applications.

21 Claims, 3 Drawing Sheets

(51) Int. Cl.
    *H04W 4/00*     (2018.01)
    *G06F 9/50*     (2006.01)

(58) Field of Classification Search
    USPC ........................................................ 709/201
    See application file for complete search history.

(56) References Cited

U.S. PATENT DOCUMENTS

| | | | | |
|---|---|---|---|---|
| 2004/0246930 | A1* | 12/2004 | Fong | H04W 72/1289 370/335 |
| 2005/0090246 | A1* | 4/2005 | Leermakers | G06F 8/61 455/428 |
| 2006/0234730 | A1* | 10/2006 | Bibr | H04L 67/2823 455/466 |
| 2007/0004333 | A1* | 1/2007 | Kavanti | H04H 60/80 455/3.06 |
| 2008/0014956 | A1 | 1/2008 | Balasubramanian | |
| 2009/0147802 | A1* | 6/2009 | Prakash | H04L 1/0028 370/474 |
| 2009/0161595 | A1* | 6/2009 | McNew | H04W 48/12 370/312 |
| 2010/0124192 | A1* | 5/2010 | Prasad | H04W 4/60 370/328 |
| 2012/0236772 | A1* | 9/2012 | Kondratiev | H04L 67/325 370/311 |
| 2013/0294325 | A1* | 11/2013 | Lee | H04W 76/20 370/312 |
| 2014/0059670 | A1* | 2/2014 | Zheng | G06F 21/10 726/17 |

FOREIGN PATENT DOCUMENTS

| | | |
|---|---|---|
| CN | 101655892 | 2/2010 |
| WO | 0176279 | 10/2001 |

* cited by examiner

METHOD AND DEVICE FOR PROVIDING COMMUNICATION CONNECTION FOR A PLURALITY OF CANDIDATE APPLICATIONS IN A MOBILE DEVICE

RELATED APPLICATIONS

This application is the national stage entry under 35 USC 371 of international application PCT/CN2013/079921, filed on Jul. 23, 2013, which claims the benefit of the Jul. 23, 2012 priority date of Chinese application No.201210257090.3, the content of which is herein incorporated by reference.

FIELD OF THE INVENTION

The present invention relates to the field of mobile communication technologies, and more specifically providing communication connection for a plurality of candidate applications in a mobile device.

BACKGROUND OF THE INVENTION

With the rapid development of mobile applications, the number of applications in a mobile device has also increased. Generally, when the mobile device has many applications that need to establish a communication connection, the applications will simultaneously open a communication module embodied thereon. Each application establishes a communication connection with a corresponding communication end.

However, for a mobile device with limited memory, this procedure consumes considerable system resources. The resulting performance degradation adversely impacts the user experience.

SUMMARY OF THE INVENTION

An object of the invention is to provide a communication connection for a plurality of candidate applications in a mobile device, such that this communication manner consumes fewer system resources.

An objective of the present invention lies in providing a method and device for providing communication connections for candidate applications in a mobile device.

According to one aspect of the present invention, there is provided a method for providing communication connection for a plurality of candidate applications in a mobile device. The method includes obtaining the plurality of candidate applications to be provided with a communication connection in the mobile device, wherein at least one of the plurality of candidate applications includes a communication module for providing communication connection, selecting a target connected-application from among the candidate applications based on application-related information of the candidate applications, wherein the target connected-application includes the communication module, and enabling the communication module of the target connected-application so as to provide communication connection for the plurality of candidate applications. The application-related information can include any combination of communication demand information of the candidate applications, communication protocol information of the communication modules of the candidate applications, and application classification information of the candidate applications.

According to another aspect of the present invention, there is also provided a mobile device providing a communication connection for a plurality of candidate applications. Such a mobile device comprises an application-obtaining module configured to obtain the plurality of candidate applications to be provided communication connection in the mobile device, wherein at least one of the plurality of candidate applications includes a communication module for providing communication connection, an application-selecting module configured to select a target connected-application from among the plurality of candidate applications based on application-related information of the candidate applications, wherein the target connected-application includes the communication module, and a communication providing module configured to enable the communication module of the target connected-application so as to provide communication connection for the plurality of candidate applications. The application-related information includes any combination of communication demand information of the candidate applications, communication protocol information of the communication modules of the candidate applications, or application classification information of the candidate applications.

Compared with the prior art, the present invention greatly saves system resources, enhances the utilization of system resources on the mobile device, and correspondingly improves the user experience through obtaining the plurality of candidate applications to be provided communication connection in the mobile device, selecting a target connected-application from among the plurality of candidate applications based on application-related information of the candidate applications, enabling the communication module of the target connected-application so as to provide communication connection for the plurality of candidate application. Furthermore, the present invention further promotes effective utilization of system resources by forwarding messages between candidate applications and corresponding communication ends via the target connected-application.

BRIEF DESCRIPTION OF THE ACCOMPANYING DRAWINGS

Other features, objectives and advantages of the present invention will become more apparent through the following detailed description of non-limiting embodiments with reference to the following drawings, wherein.

In the accompanying drawings, the same or similar reference numerals represent the same or similar components.

DETAILED DESCRIPTION OF THE INVENTION

Figure 1:
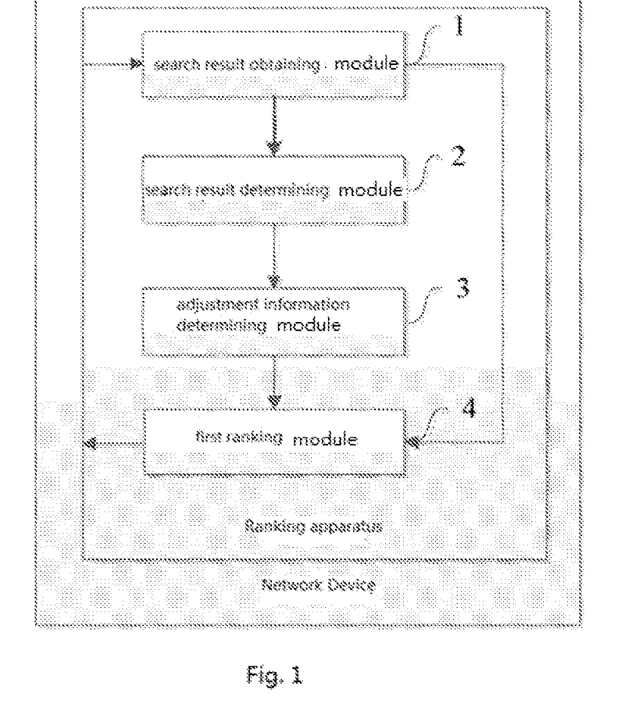
FIG. 1 shows a schematic diagram of a device for providing communication connection for a plurality of candidate applications in a mobile device according to one aspect of the present invention.

FIG. 1 shows a schematic diagram of a device for providing communication connection for a plurality of candidate applications in a mobile device. A mobile device 1 comprises an application-obtaining module 101, an application-selecting module 102, and a communication-providing module 103.

The mobile device 1 includes, but is not limited to, any kind of a mobile terminal that may perform network communication, including, but not limited to, a mobile phone, a game machine, a P Palmtop Computer (PPC), a tablet computer, or a laptop. The above mobile devices are only examples. Other mobile devices, whether existing or yet to be developed, include features that will benefit from the subject matter of the invention described herein and are contemplated to be within the scope of the present invention.

The application-obtaining module 101 obtains the plurality of candidate applications to be provided communication connection in the mobile device 1, wherein at least one of the candidate applications includes a communication module for providing communication connection. Specifically, one mobile device likely has candidate applications that need to provide communication connection, e.g., candidate applications that need to be connected to another mobile device, a server, etc. At least one of the candidate applications includes a communication module for providing a communication connection. For example, each of the candidate applications is embedded with the communication module for providing a communication connection. The application-obtaining module 101 obtains candidate applications to be provided communication connection in the mobile device 1 through, for example, a manner of obtaining application connection requests from plural candidate applications, and the like. As used herein, "plural" means two or more.

The foregoing methods of obtaining candidate applications are only exemplary. Other methods, whether existing or to be developed, of obtaining of candidate applications can be used in the present invention and should be regarded as included within the scope of the present invention.

The application-selecting module 102 selects a target connected-application from among the candidate applications based on application-related information of the candidate applications, wherein the target connected-application includes the communication module. Specifically, the application-selecting module 102 selects a target connected-application from among the candidate applications based on the candidate applications to be provided communication connection as obtained by the application module 101 according to the application-related information of the candidate applications, e.g., communication demand information of the candidate applications, communication protocol information of the communication modules of the candidate applications, and application classification information of the candidate applications, such that the target connected-application provides communication connection for the candidate applications. The selected target connected-application comprises the communication module.

For example, when the application-related information includes communication demand information of the candidate applications, the application-selecting module 102 selects a target connected-application from among the candidate applications based on the candidate applications to be provided communication connection as obtained by the application module 101, and based on the communication demand information of the candidate applications, communication protocol information of the communication modules of the candidate applications, and application classification information of the candidate applications, such that the target connected-application provides communication connection for the candidate applications. The selected target connected-application comprises the communication module.

When the application-related information includes communication demand information of the candidate applications, the application-selecting module 102 selects a target connected-application from among the candidate applications based on the candidate applications to be provided communication connection as obtained by the application module 101, and based on the communication demand information of the candidate applications, such that the target connected-application provides communication connection for the plurality of candidate applications. The selected target connected-application comprises the communication module. The communication demand information includes information that can be used to describe the demand information of a candidate connection for communication connection, such as communicate rate demand information, communication bandwidth demand information etc. For example, if a candidate application "A" is a video access application, the candidate application "A" needs a higher communication rate to establish a normal connection with a corresponding communication end. In that case, the application-selecting module 102 selects the candidate application "A" as the target connected-application, or selects an application with a higher communication rate from among the candidate applications as the target connected-application.

When the application-related information includes communication protocol information of the communication modules of candidate applications, the application-selecting module 102 selects a target connected-application from among the candidate applications based on the candidate applications to be provided communication connection as obtained by the application module 101, and based on the communication protocol information of the communication modules of the candidate applications, such that the target connected-application provides communication connection for the plurality of candidate applications. In such a case, the selected target connected-application comprises the communication module, and the communication protocol information includes information that can be used to describe a communication protocol used by a communication module included in a candidate application for establishing communication with the corresponding communication end. Examples of such protocols include but are not limited to a TCP/IP protocol, and a UDP protocol. For example, the communication protocols of the communication modules of the candidate applications might be different. Suppose the communication module of the candidate application "A" adopts the TCP/IP protocol, the communication module of the candidate application "B" adopts the UDP protocol, while the current communication network also adopts the TCP/IP protocol. In such a case, the application-selecting module 102 selects, from among the candidate applications, an application having the communication module with a communication protocol matched to the current communication network based on the matching information between the communication protocol and the current communication network. This becomes the target connected-application. For example, the application-selecting module 102 selects the candidate application "A" from among the candidate applications "A" and "B" as the target connected-application.

When the application-related information include application classification information of candidate applications, the application-selecting module 102 selects a target connected-application from among the candidate applications based on the candidate applications to be provided communication connection as obtained by the application module 101, and based on the application classification information of the candidate applications such that the target connected-application provides communication connection for the candidate applications. In this case, the selected target connected-application comprises the communication module, and the application classification information includes information that can be used to describe the application type and server type and the like corresponding to a candidate application. For example, the mobile device 1 has six candidate applications to be provided communication connection, two of which correspond to the same application classification information, e.g., corresponding to application sever "X", while the remaining four correspond to the same application classification information, e.g., corresponding to application server "Y". In such a case, the application-selecting module 102 selects one target connected-application from among the two candidate applications that correspond to the application server "X", e.g., selecting the candidate application that runs first as the target connected-application based on the sequence of running time, and then selecting a target connected-application from among the four candidate applications corresponding to the server "Y".

Preferably, the application-selecting module 102 selects a target connected-application from among the plurality of candidate applications based on the plurality of candidate applications to be provided communication connection as obtained by the application module 101, and based on any one or more types of the above application-related information of the candidate applications such that the target connected-application provides communication connection for the plurality of candidate applications. In such a case, the selected target connected-application comprises the communication module.

The methods explicitly described herein of selecting a target connection application are only examples. Other methods, whether existing or to be developed, of selecting a target connected-application may be applicable to the present invention and are considered to be within the scope of the present invention.

Similarly, the above application-related information is only exemplary. Other application-related information, whether existing or yet to be developed, may be applicable to the present invention and is regarded as included within the scope of the present invention.

The communication-providing module 103 enables the communication module of the target connected-application so as to provide communication connection for the candidate applications. Specifically, after the application-selecting module 102 selects the target connected-application from among the candidate applications, the communication-providing module 103 enables the communication module of the target connected-application so as to provide communication connection for the candidate applications through the communication module, e.g., providing communication connection with other mobile devices or servers for the candidate applications. For example, the communication-providing module 103 provides communication for candidate applications other than the target connected-application among the plurality of candidate applications; when the candidate application needs to communicate with a corresponding communication end such as a mobile device, a server, etc., the target connected-application communicates, for the candidate application, messages with the corresponding communication end. In another example, the communication-providing module 103 provides communication connection for the target connected-application such that the target connected-application may communicate with the corresponding communication end.

The method and system described herein obtain the candidate applications to be provided communication connection in the mobile device, selects a target connected-application from among them based on the application-related information of the candidate applications, and enables the communication module of the target connected-application so as to provide communication connection for the candidate applications. The method and system described herein thus greatly save system resources, enhance the system resource utilization of the mobile device, and correspondingly improve the user experience.

Preferably, respective modules of the mobile device 1 work continuously therebetween. Specifically, the application-obtaining module 101 obtains the plurality of candidate applications to be provided communication connection in the mobile device, wherein at least one of the candidate applications includes a communication module for providing communication connection; the application-selecting module 102 selects a target connected-application from among the candidate applications based on the application-related information of the candidate applications, wherein the target connected-application includes the communication module; and the communication-providing module 103 enables the communication module of the target connected-application so as to provide communication connection for the candidate applications. As used herein, "continuously" means that respective modules of the mobile device 1 constantly perform the tasks of obtaining a plurality of candidate applications, selecting a target connected-application, and enabling the communication module, respectively, until the mobile device 1 stops obtaining a plurality of candidate applications to be provided communication connection.

Preferably, the application-selecting module 102 selects a target connected-application from among the candidate applications based on the application-related information of the candidate applications in conjunction with a predetermined threshold for the number of applications. In such a case, the the target connected-application comprises the communication module.

Specifically, the mobile device 1 may preset a predetermined threshold for the number of applications. The predetermined threshold for the number of applications is used for judging whether a new target connected-application should be selected. The mobile device 1 then enables the communication module of the target connected-application.

For example, if the number of candidate applications to be provided with a communication connection in the mobile device 1 exceeds the predetermined threshold for the number of applications, at least one target connected-application is newly added.

For example, suppose the predetermined threshold for the number of applications is five. Suppose that, in the mobile device 1, there are six candidate applications to be provided with a communication connection. In this case, the application-selecting module 102 selects two target connected-applications from among the six candidate applications based on the application-related information of the candidate applications in conjunction with the predetermined threshold, which is five. For the number of applications, for example, it selects two applications from among the six candidate applications as the target connected-applications according to the communication demand information of the six candidate applications, the communication protocol information of the communication modules of the six candidate applications, and the application classification information of the six candidate applications, etc.

In another example, suppose the predetermined threshold of the number of applications is five. If there are eleven candidate applications to be provided communication connection in the mobile device 1, the application-selecting module 102 will select three applications from among the eleven candidate applications as the target connected-applications based on the application-related information of the candidate applications in conjunction with the predetermined threshold, five, for the number of applications.

The subject matter described herein makes selection of target connected-applications more reasonable and further enhances the system resource utilization and processing speed of the mobile device by obtaining the plurality of candidate applications to be provided communication connection in the mobile device, selecting a target connected-application from among the plurality of candidate applications based on the application-related information of the candidate applications in conjunction with the predetermined threshold for the number of applications, and enabling the communication module of the target connected-application so as to provide communication connection for the plurality of candidate application.

Preferably, the mobile device 1 further comprises a module-scheduling module (not shown). When the communication module of the target connected-application is enabled, the module-scheduling module broadcasts an application connection message to the candidate connected-applications through the target connected-application. The candidate connected-applications include candidate applications other than the target connected-application among the plurality of candidate applications. The application connection message includes an application identification of the target connected-application. The application connection message is received through at least one of the plurality of candidate connected-applications. Based on the application connection message, the communication module corresponding to at least one of the plurality of candidate connected-applications is closed.

Specifically, when the communication-providing module 104 enables the communication module of the target connected-application, the target connected-application establishes a communication connection with the corresponding communication end. Based on the communication connection, the module-scheduling module generates an application connection message by adding an application identification of the target connected-application into a particular field or through other methods. It then broadcasts the application connection message to the candidate connected-applications through the target connected-application. The application connection message includes the application identification of the target connected-application. Afterwards, the communication-providing module 103 receives the application connection message through at least one of the candidate connected-applications. Based on the application connection message, it closes the communication module corresponding to at least one of the candidate connected-applications. In such a case, the candidate connected-applications include candidate applications other than the target connected-application among the plurality of candidate applications.

The techniques identified herein reduce use of system resources, enhance utilization of the mobile device's system resources, and improve the user-experience by sending the application connection message to the candidate connected-applications through the target connected-application such that the candidate connected-applications close the communication modules thereon based on the application connection message.

Figure 2:
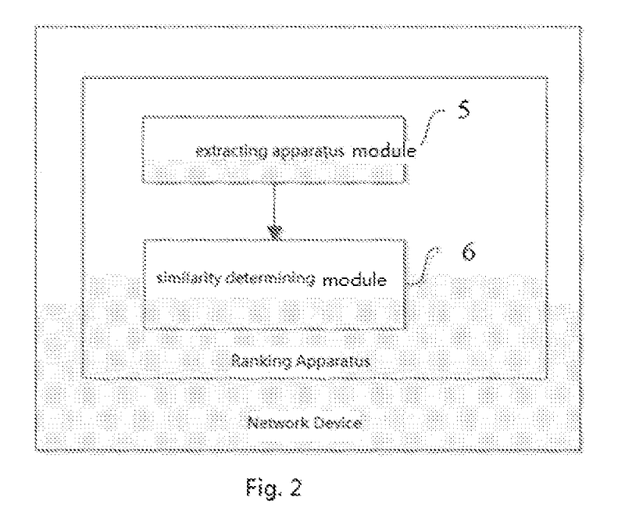
FIG. 2 shows a schematic diagram of a device for providing communication connection for a plurality of candidate applications in a mobile device according to a preferred embodiment of the present invention.

FIG. 2 shows a schematic diagram of a device for providing communication connection for a plurality of candidate applications in a mobile device according to a preferred embodiment of the present invention. The mobile device 1 further comprises an application-message sending module 204 and an application-message forwarding module 205. Hereinafter, the preferred embodiment will be described in detail with reference to FIG. 2.

Specifically, an application-obtaining module 201 obtains a plurality of candidate applications in the mobile device to be provided communication connection. At least one of the candidate applications includes a communication module for providing communication connection. An application-selecting module 202 selects a target connected-application from among the candidate applications based on the application-related information of the candidate applications. The target connected-application includes the communication module. A communication-providing module 203 enables the communication module of the target connected-application so as to provide communication connection for the candidate applications. An application-message sending module 204 sends a first application message to the target connected-application through the first candidate connected-application based on the application identification of the target connected-application. An application-message forwarding module 205 receives the first application message sent by the first candidate application through the target connected-application, and sends the first application message to a corresponding communication end through the communication module. The application-obtaining module 201, the application-selecting module 202, and the communication-providing module 203 are identical or similar to corresponding modules described in FIG. 1, the descriptions of which are incorporated herein by reference.

The plurality of candidate connected-applications includes a first candidate connected-application. Through the first candidate connected-application, the application-message sending module 204 sends a first application message to the target connected-application based on the application identification of the target connected-application. Specifically, the plurality of candidate connected-applications comprises a first candidate connected-application. After the target connected-application successfully enables the communication module thereon and establishes a communication connection with the corresponding communication end, it will broadcast an application-connection message to the candidate connected-applications. The application-connection message includes the application identification of the target connected-application. The application message sending module 204 receives the broadcast application-connection message through the first candidate connected-application, extracts the application identification of the target connected-application from a particular field of the application-connection message, and then sends the first application message to the target connected-application based on the application identification.

The first application message includes an application message that needs to be sent to a communication end such as another mobile device or a server. Such a message could be an instant message, a data request message, or the like.

For example, suppose application "A" is a target connected-application. After the application "A" successfully enables the communication module thereon and establishes a communication connection with the corresponding communication end, it will broadcast an application-connection message to the candidate connected-applications "B", "C", and "D". The application connection message includes the application identification of the target connected-application. Afterwards, the application message sending module 204 receives the application connection message broadcast by the application "A" through the application "B" therein, extracts the application ID of the application "A" from a particular field of the application connection message, and then sends the first application message to the application "A" based on the application ID, e.g., sends, to the application "A", a data request message for requesting data from the server "X".

The application-message forwarding module 205 receives a first application-message sent by the first candidate application through the target connected-application, and sends the first application-message to a corresponding communication end through the communication module. Specifically, when the application-message transmitting module 204 sends, to the target connected-application, a first application-message through the first candidate connected-application, the application message forwarding module 205 receives, through the target connected-application, the first application-message sent by the first candidate-application, and then sends it through the communication module enabled by the target connected-application to the communication end corresponding to the first application message.

The application-message forwarding module 205 receives, through the application "A", the data request message sent by the application "B". It then sends the data request message through the communication module on the application "A" to the corresponding server "X" to request data.

Preferably, the plurality of candidate connected-applications include a first candidate connected-application, wherein the mobile device 1 further comprises an application-message broadcasting module (not shown). The application-message broadcasting module broadcasts a first application message to be sent to a corresponding communication end through the first candidate connected-application. The application message forwarding module 205 receives the first application message broadcast by the first candidate application through the target connected-application, and sends the first application message to the corresponding communication end through the communication module.

Specifically, if after the target connected-application successfully establishes a communication connection with a corresponding communication end, no application connection message is broadcast, or the first candidate connected-application does not receive the application connection message broadcast by the target connected-application, or the first candidate connected-application fails to successfully extract the application identification of the target connected-application from the application connection message, then the application-message broadcasting module broadcasts, through the first candidate connected-application, the first application message to be sent to the corresponding communication end. Afterwards, the application message forwarding module 205 receives, through the target connected-application, the first application message broadcast by the first candidate application, and sends, through the communication module, the first application message to the corresponding communication end.

The technique described herein enhances the utilization of system resources by forwarding, for the multiple candidate applications, the corresponding application message to the corresponding communication end through the selected target connected-application.

Preferably, the first application message includes the application identification corresponding to the first candidate connected-application. The application message forwarding module 205 further comprises an identification extracting unit (not shown) and an application-determining unit (not shown). The identification-extracting unit extracts the application identification from the first application message through the target connected-application. The application-determining unit determines a first candidate connected-application corresponding to the application identification based on the application identification, Specifically, the first application message, which is sent by the first candidate connected-application to the target connected-application or broadcast by the first candidate connected-application, may comprise the application identification corresponding to the first candidate connected-application, e.g., the application ID of the first candidate connected-application. When the application message forwarding module 205 receives the first application message through the target connected-application, the identification extracting unit extracts the application identification from a particular field of the first application message through the target connected-application. Afterwards, the application-determining unit determines a first candidate connected-application corresponding to the application identification based on the application identification, i.e., determines whether to forward, for the first candidate connected-application, the corresponding first application message to the corresponding communication end. If the identification extracting unit can successfully extract the application identification from the first application message, the application-determining unit determines that the first application message may be forwarded to the corresponding communication end for the first candidate connected-application corresponding to the application identification.

More preferably, the application-determining unit determines a first candidate connected-application corresponding to the application identification based on the application identification in conjunction with application authorization information. Specifically, after the identification extracting unit extracts the application identification from a particular field of the first application message, the application-determining unit determines a first candidate connected-application corresponding to the application identification based on the application identification in conjunction with application authorization information (e.g., based on whether the application identification has been authorized, whether the first candidate connected-application corresponding to the application identification and the target connected-application have the same application classification information, etc.), i.e., determining whether to forward, for the first candidate connected-application, the corresponding first application message to the communication end.

The technique described herein makes the forwarding process more reliable and further enhances system resource utilization of the mobile device by determining a first candidate connected-application based on the application identification in the application message and forwarding, for the first candidate connected-application, the corresponding first application message to the corresponding communication end.

Preferably, the application message forwarding module 205 receives a first application message sent by the first candidate application through the target connected-application; encodes the first application message based on historical message transfer records between the target connected-application and the corresponding communication end, to reduce data amount of the first application messages; and sends the encoded first application message to the corresponding communication end through the communication module.

Specifically, the application message forwarding module 205 receives a first application message sent by the first candidate application through the target connected-application; then, for example, through interaction with an application records base of the mobile device 1, obtains historical message transfer records between the target connected-application and the corresponding communication end; based on the historical message transfer records, encodes the first application message, to reduce the data amount of the first application message, e.g., if the first application message includes a message that has been communicated historically, deletes the communicated message, and re-encodes the first application message; afterwards, sends the encoded first application message to the corresponding communication end through the communication module of the target connected-application.

The method described herein enhances system resource utilization of the mobile device and raises system processing speed by encoding the first application message based on historical message transfer records to reduce the data amount of the first application message.

Preferably, the candidate connected-applications include a second candidate connected-application. The the application message forwarding module 205 receives a second application message sent by the second candidate connected-application through the target connected-application; merges the first application message and the second application message to obtain a merged target application message; and sends the merged target application message to the corresponding communication end.

Specifically, the candidate connected-applications include a second candidate connected-application, the second candidate connected-application may also send the second application message to the target connected-application. The application forwarding module 205 receives the second application message sent by the second candidate connected-application through the target connected-application; and further merges the first application message and the second application message to obtain a merged target application message. Preferably, the application message-forwarding module 205 also merges the first application message and the second application message to remove redundant information, reduces the data amount of the target application message; and afterwards, sends the merged target application message to the corresponding communication end through the communication module on the target connected-application.

The method described herein further enhances the system resource utilization of the mobile device and raises system processing speed by merging the first application message and the second application message and sending the merged target application message to the corresponding communication end.

In one preferred embodiment, the candidate connected-applications include a third candidate connected-application. The mobile device 1 further comprises a service message receiving module (not shown) and a service message forwarding module (not shown). The service message receiving module receives a service message sent by the corresponding communication end through the target connected-application. The service message includes the application identification of the third candidate application. The service message-forwarding module sends the service message to the third candidate application corresponding to the application identification based on the application identification.

Specifically, besides forwarding the first application message of the candidate connected-application to the corresponding communication end, the target connected-application in the mobile device 1 may also forward a service message of the corresponding communication end to the candidate connection application. The service message comprises a service message such as a service notification message, and the like, that needs to be pushed to an application by a communication end such as a mobile device or a server. For example, the server "Y" sends a service notification message to the mobile device 1. This service notification message includes the application identification of the application "A", for notifying the application "A" in the mobile device 1 that the target connected-application in the mobile device 1 is application "B"; then the service message receiving module receives, through the application "B", the service notification message sent by the server "Y". Afterwards, the service message forwarding module extracts the application identification from a particular field of the service notification message, and determines the corresponding application "A" based on the application identification. It then sends the service notification message to the application "A".

The method described herein further enhances system resource utilization by forwarding a service message of the corresponding communication end to the plurality of candidate applications.

Figure 3:
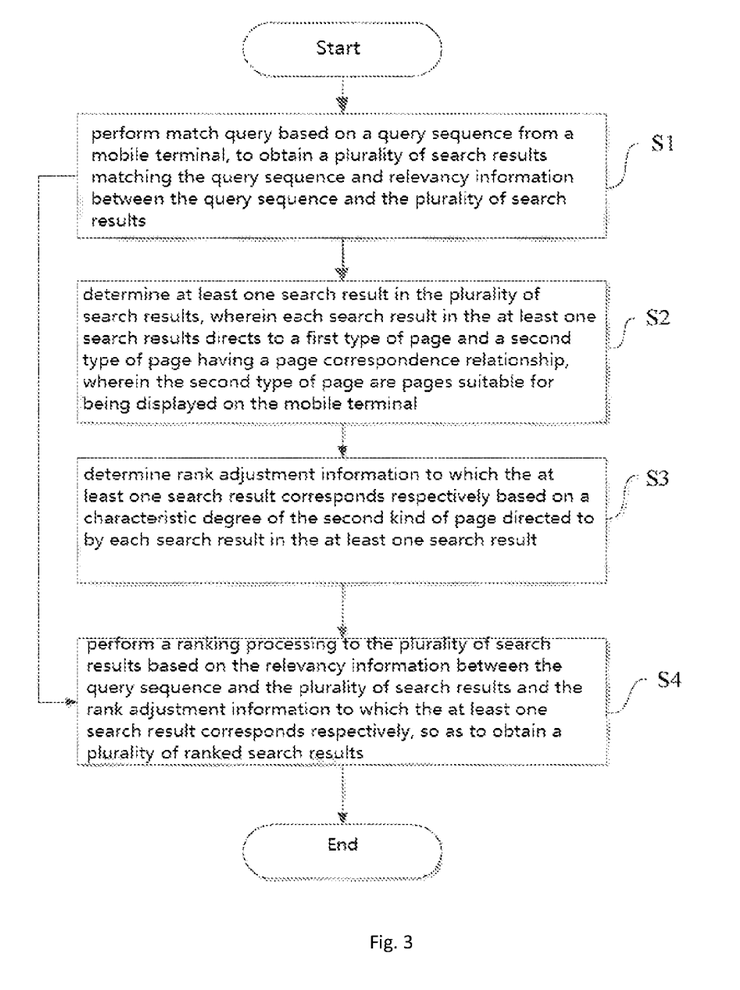
FIG. 3 shows a flow diagram of a method for providing communication connection for a plurality of candidate applications in a mobile device according to one aspect of the present invention.

FIG. 3 shows a flow diagram of a method for providing communication connection for a plurality of candidate applications in a mobile device.

The mobile device 1 includes, but is not limited to, any kind of a mobile terminal that may perform network communication, including, but not limited to, a mobile phone, a game machine, a P Palmtop Computer (PPC), a tablet computer, or a laptop, etc. The above mobile devices are only examples. Other devices, whether existing or yet to be developed, if applicable to the present invention, should also be included within the protection scope of the present invention.

In step S301, the mobile device 1 obtains the plurality of candidate applications in the mobile device to be provided communication connection. At least one of the candidate applications includes a communication module for providing communication connection. Specifically, one mobile device likely has a plurality of candidate applications that need to be provided with a communication connection, e.g., a plurality of candidate applications that need to be connected to other mobile device, server, etc. At least one of the candidate applications includes a communication module for providing communication connection. In one example, each of the candidate applications is embedded with the communication module for providing communication connection.

In step S301, the mobile device 1 obtains candidate applications to be provided with a communication connection in the mobile device 1 through, for example, obtaining application connection requests from the plurality of candidate applications, and the like. As used herein, "plural" means two or more.

The foregoing methods obtaining a plurality of candidate applications are only exemplary. Other equivalent methods, whether existing or to be developed, for obtaining a plurality of candidate applications are included within the protection scope of the present invention.

In step S302, the mobile device 1 selects a target connected-application from among the plurality of candidate applications based on application-related information of the candidate applications. In this case, the target connected-application includes the communication module.

Specifically, in step S302, the mobile device 1 selects a target connected-application from among the plurality of candidate applications based on the plurality of candidate applications to be provided communication connection as obtained in step S301 according to the application-related information of the candidate applications, e.g., communication demand information of the candidate applications, communication protocol information of the communication modules of the candidate applications, and application classification information of the candidate applications, such that the target connected-application provides communication connection for the plurality of candidate applications. The selected target connected-application comprises the communication module.

For example, when the application-related information includes communication demand information of the candidate applications, in step S302, the mobile device 1 selects a target connected-application from among the plurality of candidate applications based on the plurality of candidate applications to be provided communication connection as obtained in step S301, and based on the communication demand information of the candidate applications, communication protocol information of the communication modules of the candidate applications, and application classification information of the candidate applications, such that the target connected-application provides communication connection for the plurality of candidate applications. The selected target connected-application comprises the communication module.

When the application-related information includes communication demand information of the candidate applications, in step S302, the mobile device 1 selects a target connected-application from among the plurality of candidate applications based on the plurality of candidate applications to be provided communication connection as obtained in step S301, and based on the communication demand information of the candidate applications, such that the target connected-application provides communication connection for the plurality of candidate applications. The selected target connected-application comprises the communication module. The communication demand information includes information that can be used to describe the demand of a candidate connection for communication connection, such as communicate rate demand information, communication bandwidth demand information etc. For example, if a candidate application "A" is a video access application, the candidate application "A" needs a higher communication rate to establish a normal connection with a corresponding communication end. In such a case, in step S302, the mobile device 1 selects the candidate application "A" as the target connected-application, or selects an application with a higher communication rate from among the plurality of candidate applications as the target connected-application.

When the application-related information includes communication protocol information of the communication modules of candidate applications, in step S302, the mobile device 1 selects a target connected-application from among the plurality of candidate applications based on the plurality of candidate applications to be provided communication connection as obtained in step S301, and based on the communication protocol information of the communication modules of the candidate applications, such that the target connected-application provides communication connection for the plurality of candidate applications. The selected target connected-application comprises the communication module. The communication protocol information includes information that can be used to describe a communication protocol used by a communication module included in a candidate application for establishing communication with the corresponding communication end, such as a TCP/IP protocol, a UDP protocol, etc.

For example, the communication protocols of the communication modules of the plurality of candidate applications might be different. Suppose the communication module of the candidate application "A" adopts the TCP/IP protocol, the communication module of the candidate application "B" adopts the UDP protocol, while the current communication network also adopts the TCP/IP protocol. Then, in step S302, the mobile device 1 selects, from among the plurality of candidate applications, an application having the communication module with a communication protocol matched to the current communication network based on the matching information between the communication protocol and the current communication network as the target connected-application. For example, the mobile device 1 selects the candidate application "A" from among the candidate applications "A" and "B" as the target connected-application.

When the application-related information includes application classification information of candidate applications, in step S302, the mobile device 1 selects a target connected-application from among the plurality of candidate applications based on the plurality of candidate applications to be provided communication connection as obtained in step S301, and based on the application classification information of the candidate applications, such that the target connected-application provides communication connections for the plurality of candidate applications. In this case, the selected target connected-application comprises the communication module.

The application classification information includes information that can be used to describe the application type and server type and the like corresponding to a candidate application. For example, the mobile device 1 has six candidate applications to be provided communication connection, wherein two candidate applications correspond to the same application classification information, e.g., corresponding to application sever "X", while the other four candidate applications correspond to the same application classification information, e.g., corresponding to application server "Y". In such a case, in step S302, the mobile device 1 selects one target connected-application from among two candidate applications that correspond to the application server "X", e.g., selecting the candidate application that runs first as the target connected-application based on the sequence of running time. It then selects a target connected-application from among the four candidate applications corresponding to the server "Y".

Preferably, in step S302, the mobile device 1 selects a target connected-application from among the plurality of candidate applications based on the plurality of candidate applications to be provided communication connection as obtained in step S301, and based on any one or more types of the above application-related information of the candidate applications such that the target connected-application provides a communication connection for the plurality of candidate applications. The selected target connected-application comprises the communication module.

Those skilled in the art should understand that the above methods of selecting a target connection application are only examples, and that other methods, both existing and yet to be developed, methods of selecting a target connected-application, if applicable to the present invention, are included within the scope of the present invention.

The above application-related information is only exemplary. Other such information, both existing and yet to be developed, if applicable to the present invention, is included with the scope of the invention.

In step 303, the mobile device 1 enables the communication module of the target connected-application so as to provide communication connection for the plurality of candidate applications. Specifically, after the mobile device 1 selects the target connected-application from among the plurality of candidate applications in step S302, the mobile device 1, in step S303, enables the communication module of the target connected-application so as to provide communication connection for the plurality of candidate applications through the communication module, e.g., to provide communication connection with other mobile device or server for the plurality of candidate applications.

For example, in step S303, the mobile device 1 provides communication for candidate applications other than the target connected-application among the plurality of candidate applications. When the candidate application needs to communicate with a corresponding communication end such as a mobile device, a server, etc., the target connected-application communicates, for the candidate application, messages with the corresponding communication end.

In another example, in step S303, the mobile device 1 provides communication connection for the target connected-application, such that the target connected-application may communicate with the corresponding communication end.

The apparatus described herein obtains the plurality of candidate applications to be provided communication connection in the mobile device, selects a target connected-application from among the plurality of candidate applications based on the application-related information of the candidate applications, enables the communication module of the target connected-application so as to provide communication connection for the plurality of candidate application. In doing so, it greatly saves system resources, enhances the utilization of system resources, and then improves the user experience.

Preferably, respective modules of the mobile device 1 work continuously therebetween. Specifically, in step S301, the mobile device 1 obtains the plurality of candidate applications to be provided communication connection in the mobile device. At least one of the plurality of candidate applications includes a communication module for providing communication connection.

In step S302, the mobile device 1 selects a target connected-application from among the plurality of candidate applications based on the application-related information of the candidate applications. The target connected-application includes the communication module.

In step S303, the mobile device 1 enables the communication module of the target connected-application so as to provide communication connection for the plurality of candidate applications.

As used herein, "continuously" means that, during the course of an extended period, the respective modules of the mobile device 1 constantly perform obtaining a plurality of candidate applications, selecting a target connected-application, and enabling the communication module, respectively, until the mobile device 1 stops obtaining a plurality of candidate applications to be provided communication connection.

Preferably, in step S302, the mobile device 1 selects a target connected-application from among the plurality of candidate applications based on the application-related information of the candidate applications in conjunction with a predetermined threshold for the number of applications. The target connected-application comprises the communication module.

Specifically, the mobile device 1 may preset a predetermined threshold for the number of applications. The predetermined threshold for the number of applications is used for judging whether a new target connected-application should be selected and for enabling the communication module of the target connected-application.

For example, if the number of candidate applications to be provided communication connection in the mobile device 1 exceeds the predetermined threshold for the number of applications, at least one target connected-application is newly added.

For example, suppose that the predetermined threshold for the number of applications is five. Then, when there are six candidate applications to be provided communication connection in the mobile device 1, in step S302, the mobile device 1 selects two target connected-applications from among the six candidate applications based on the application-related information of the candidate applications in conjunction with a predetermined threshold 5 for the number of applications, for example, selects two applications from among the six candidate applications as the target connected-applications according to the communication demand information of the six candidate applications, the communication protocol information of the communication modules of the six candidate applications, and the application classification information of the six candidate applications, etc.

For another example, suppose the predetermined threshold of the number of applications is five, then when there are eleven candidate applications to be provided communication connection in the mobile device 1, in step S302, the mobile device 1 will select three applications from among the eleven candidate applications as the target connected-applications based on the application-related information of the candidate applications in conjunction with the predetermined threshold 5 for the number of applications.

The subject matter described herein makes selection of target connected-applications more reasonable and further enhances the system resource utilization and processing speed of the mobile device by obtaining the plurality of candidate applications to be provided communication connection in the mobile device, selecting a target connected-application from among the plurality of candidate applications based on the application-related information of the candidate applications in conjunction with the predetermined threshold for the number of applications, enabling the communication module of the target connected-application so as to provide communication connection for the plurality of candidate application.

Preferably, the method further comprises step S306 (not shown). In step S306, when the communication module of the target connected-application is enabled, the mobile device 1 broadcasts an application connection message to the candidate connected-applications through the target connected-application. The candidate connected-applications include candidate applications other than the target connected-application among the plurality of candidate applications. The application connection message includes an application identification of the target connected-application. The application connection message is received through at least one of the plurality of candidate connected-applications. Based on the application connection message, the communication module corresponding to at least one of the plurality of candidate connected-applications is closed.

Specifically, in step S303, when the mobile device 1 enables the communication module of the target connected-application, the target connected-application establishes a communication connection with the corresponding communication end. In step S306, based on the communication connection, the mobile device 1 generates an application connection message by adding an application identification of the target connected-application into a particular field or through other manners, and then, broadcasts the application connection message to the candidate connected-applications through the target connected-application. This application connection message includes the application identification of the target connected-application. Afterwards, in step S303, the mobile device 1 receives the application connection message through at least one of the candidate connected-applications, and based on the application connection message, closes the communication module corresponding to at least one of the plurality of candidate connected-applications. The candidate connected-applications include candidate applications other than the target connected-application among the plurality of candidate applications.

The subject matter described herein greatly saves system resources, enhances the system resource utilization of the mobile device, and then correspondingly improves the use experience of a user by sending the application connection message to the candidate connected-applications through the target connected-application, such that the candidate connected-application close the communication modules thereon based on the application connection message.

Figure 4:
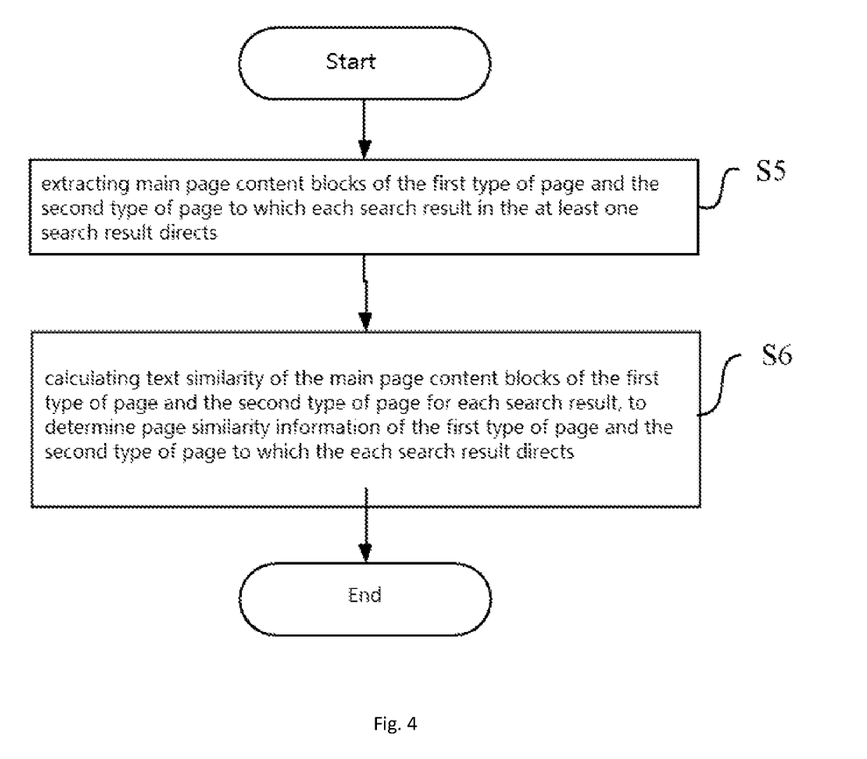
FIG. 4 shows a flow diagram of a method for providing communication connection for a plurality of candidate applications in a mobile device according to a preferred embodiment of the present invention.

FIG. 4 shows a flow diagram of a method for providing communication connection for a plurality of candidate applications in a mobile device according to a preferred embodiment of the present invention. Hereinafter, the present preferred embodiment will be described in detail with reference to FIG. 4.

Specifically, in step S401, the mobile device 1 obtains a plurality of candidate applications to be provided communication connection in the mobile device, wherein at least one of the plurality of candidate applications includes a communication module for providing communication connection.

In step S402, the mobile device 1 selects a target connected-application from among the plurality of candidate applications based on the application-related information of the candidate applications. The target connected-application includes the communication module.

In step S403, the mobile device 1 enables the communication module of the target connected-application so as to provide communication connection for the plurality of candidate applications.

In step S404, the mobile device 1 sends a first application message to the target connected-application through the first candidate connected-application based on the application identification of the target connected-application.

In step S405, the mobile device 1 receives the first application message sent by the first candidate application through the target connected-application, and sends the first application message to a corresponding communication end through the communication module. Steps S401-403 are identical or similar to corresponding steps in FIG. 3. The descriptions will not be repeated here, but are instead incorporated here by reference.

The candidate connected-applications include a first candidate connected-application. Through the first candidate connected-application, in step S404, the mobile device 1 sends a first application message to the target connected-application based on the application identification of the target connected-application. Specifically, the candidate connected-applications comprise a first candidate connected-application.

After the target connected-application successfully enables the communication module thereon and establishes a communication connection with the corresponding communication end, it will broadcast an application connection message to the candidate connected-applications. The application connection message includes the application identification of the target connected-application.

In step S404, the mobile device 1 receives the broadcast application connection message through the first candidate connected-application, extracts the application identification of the target connected-application from a particular field of the application connection message, and then sends the first application message to the target connected-application based on the application identification.

The first application message includes an application message that needs to be sent to a communication end such as other mobile device or server, e.g., an instant message, a data request message, and the like.

For example, suppose application "A" is a target connected-application. After the application "A" successfully enables the communication module thereon and establishes a communication connection with the corresponding communication end, it will broadcast an application connection message to the candidate connected-applications "B", "C", and "D". The application connection message includes the application identification of the target connected-application.

Afterwards, in step S404, the mobile device 1 receives the application connection message broadcast by the application "A" through the application "B." It extracts the application ID of the application "A" from a particular field of the application connection message, and then sends the first application message to the application "A" based on the application ID, e.g., sends, to the application "A", a data request message for requesting data from the server "X".

In step S405, the mobile device 1 receives a first application message sent by the first candidate application through the target connected-application, and sends the first application message to a corresponding communication end through the communication module.

Specifically, when the mobile device 1 sends, to the target connected-application, a first application message through the first candidate connected-application in step S404, the mobile device 1, in step S405, receives, through the target connected-application, the first application message sent by the first candidate application, and then sends it, through the communication module enabled by the target connected-application, to the communication end corresponding to the first application message.

In step S405, the mobile device 1 receives, through the application "A", the data request message sent by the application "B", and sends, through the communication module on the application "A", the data request message to the corresponding server "X", to request data.

Preferably, the candidate connected-applications include a first candidate connected-application.

The method further comprises step S407 (not shown). In step S407, the mobile device 1 broadcasts a first application message to a corresponding communication end through the first candidate connected-application.

In step S405, the mobile device 1 receives the first application message broadcast by the first candidate application through the target connected-application, and sends the first application message to the corresponding communication end through the communication module.

Specifically, if after the target connected-application successfully establishes a communication connection with a corresponding communication end, no application connection message is broadcast, or the first candidate connected-application does not receive the application connection message broadcast by the target connected-application, or the first candidate connected-application fails to successfully extract the application identification of the target connected-application from the application connection message, then in step S407, the mobile device 1 broadcasts, through the first candidate connected-application, the first application message to be sent to the corresponding communication end.

Afterwards, in step S405, the mobile device 1 receives, through the target connected-application, the first application message broadcast by the first candidate application, and sends, through the communication module, the first application message to the corresponding communication end.

The subject matter described herein further enhances the utilization of system resources by forwarding, for the multiple candidate applications, the corresponding application message to the corresponding communication end through the selected target connected-application.

Preferably, the first application message includes the application identification corresponding to the first candidate connected-application.

In some practices, the step S405 further comprises sub-step S4051 (not shown) and sub-step S4052 (not shown).

In sub-step S4051, the mobile device 1 extracts the application identification from the first application message through the target connected-application.

In sub-step S4052, the mobile device 1 determines a first candidate connected-application corresponding to the application identification based on the application identification.

Specifically, the first application message, which is sent by the first candidate connected-application to the target connected-application or broadcast by the first candidate connected-application, may comprise the application identification corresponding to the first candidate connected-application, e.g., the application ID of the first candidate connected-application.

When the mobile device 1 receives the first application message through the target connected-application in step S405, the mobile device 1 extracts the application identification from a particular field of the first application message through the target connected-application in sub-step S4051.

Afterwards, in sub-step S4052, the mobile device 1 determines a first candidate connected-application corresponding to the application identification based on the application identification, i.e., it determines whether to forward, for the first candidate connected-application, the corresponding first application message to the corresponding communication end.

If in sub-step S4051, the mobile device 1 can successfully extract the application identification from the first application message, then in sub-step S4052, the mobile device 1 determines that the first application message may be forwarded to the corresponding communication end for the first candidate connected-application corresponding to the application identification.

More preferably, in sub-step S4052, the mobile device 1 determines a first candidate connected-application corresponding to the application identification based on the application identification in conjunction with application authorization information.

Specifically, after the mobile device 1 extracts the application identification from a particular field of the first application message, in sub-step S4051, the mobile device 1 determines, in sub-step S4052, a first candidate connected-application corresponding to the application identification based on the application identification in conjunction with application authorization information. In one practice, it does so based on whether the application identification has been authorized, and whether the first candidate connected-application corresponding to the application identification and the target connected-application have the same application classification information. This includes determining whether to forward, for the first candidate connected-application, the corresponding first application message to the communication end.

The subject matter described herein makes the forwarding process more reliable and further enhances system resource utilization of the mobile device by determining a first candidate connected-application based on the application identification in the application message and forwarding, for the first candidate connected-application, the corresponding first application message to the corresponding communication end.

Preferably, in step S405, the mobile device 1 receives a first application message sent by the first candidate application through the target connected-application. I then encodes the first application message based on historical message transfer records between the target connected-application and the corresponding communication end, to reduce data amount of the first application messages. Finally, it sends the encoded first application message to the corresponding communication end through the communication module.

Specifically, in step S405, the mobile device 1 receives a first application message sent by the first candidate application through the target connected-application. Then, for example, through interaction with an application records base of the mobile device 1, it obtains historical message transfer records between the target connected-application and the corresponding communication end. Based on the historical message transfer records, it then encodes the first application message, to reduce the data amount of the first application message. For example, if the first application message includes a message that has been communicated historically, it deletes the communicated message, and re-encodes the first application message. Afterwards, it sends the encoded first application message to the corresponding communication end through the communication module of the target connected-application.

The subject matter described herein further enhances system resource utilization of the mobile device and raises system processing speed by encoding the first application message based on historical message transfer records to reduce the data amount of the first application message.

Preferably, the candidate connected-applications include a second candidate connected-application.

In step S405, the mobile device 1 receives a second application message sent by the second candidate connected-application through the target connected-application; merges the first application message and the second application message to obtain a merged target application message; and sends the merged target application message to the corresponding communication end.

Specifically, the candidate connected-applications include a second candidate connected-application. The second candidate connected-application may also send the second application message to the target connected-application.

In step S405, the mobile device 1 receives the second application message sent by the second candidate connected-application through the target connected-application. It then merges the first application message and the second application message to obtain a merged target application message. Preferably, in step S405, the mobile device 1 also merges the first application message and the second application message to remove redundant information, thereby reducing the data amount of the target application message. Afterwards, it sends the merged target application message to the corresponding communication end through the communication module on the target connected-application.

The subject matter described herein further enhances the system resource utilization of the mobile device and raises system processing speed by merging the first application message and the second application message and sending the merged target application message to the corresponding communication end.

In one preferred embodiment, the candidate connected-applications include a third candidate connected-application.

The method further comprises step S408 (not shown) and step S409 (not shown).

In step S408, the mobile device 1 receives a service message sent by the corresponding communication end through the target connected-application. The service message includes the application identification of the third candidate application.

In step S409, the mobile device 1 sends the service message to the third candidate application corresponding to the application identification based on the application identification.

Specifically, besides forwarding the first application message of the candidate connected-application to the corresponding communication end, the target connected-application in the mobile device 1 may also forward a service message of the corresponding communication end to the candidate connection application. The service message comprises a service message such as a service notification message, and the like, that needs to be pushed to an application by a communication end such as a mobile device or a server.

For example, the server "Y" may send a service notification message to the mobile device 1. This service notification message includes the application identification of the application "A", for notifying the application "A" in the mobile device 1 that the target connected-application in the mobile device 1 is application "B". In step S408, the mobile device 1 receives, through the application "B", the service notification message sent by the server "Y". Afterwards, in step S409, the mobile device 1 extracts the application identification from a particular field of the service notification message, and determines the corresponding application "A" based on the application identification. It then sends the service notification message to the application "A".

The subject matter described herein further enhances system resource utilization by forwarding a service message of the corresponding communication end to the plurality of candidate applications.

The software program of the present invention may be executed through a processor to implement the steps or functions as mentioned above. Likewise, the software program (including relevant data structure) of the present invention may be stored in a computer readable recording medium, e.g., RAM memory, magnetic or optic driver or soft floppy or similar devices. Additionally, some steps or functions of the present invention may be implemented by hardware, for example, by a circuit cooperating with the processor so as to execute various functions of steps.

Additionally, a part of the present invention may be implemented as a computer program product, e.g., a computer program instruction, that, when executed by the computer, causes execution of the methods described herein. The program instruction invoking the method of the present invention may be stored in a fixed or removable non-transitory recording medium, and/or communicated through broadcast or data stream in other signal carrying media, and/or stored in a non-transitory working memory of a computer device running according to the program instruction.

One embodiment according to the present invention comprises an apparatus that includes a memory for storing the computer program instructions, and a processor for executing the program instructions. When being executed by the processor, the computer program instructions trigger the apparatus to operate the method and/or technical solution according to the plurality of embodiments described above.

The invention is not limited to the details of the above exemplary embodiments, and may be implemented with other embodiments without departing from the spirit or basic features of the present invention. The embodiments should be regarded as exemplary, not limiting. The scope of the present invention is limited only by the appended claims. Thus, all variations falling into the meaning and scope of equivalent elements of the claims are intended to be covered within the invention. The term "comprise" does not exclude other units or steps. The use of the singular does not exclude the plural. A plurality of units or modules stated in an apparatus claim may also be implemented by a single unit or module through software or hardware. Terms such as "first" and "second" are used to indicate names, and not to indicate any particular sequence.

Having described the invention, and a preferred embodiment thereof, what is claimed as new, and secured by letters patent is:

1. A method comprising providing communication connection for a plurality of candidate applications in a mobile device, wherein providing communication connection for a plurality of candidate applications in a mobile device comprises obtaining the candidate applications to be provided communication connection in the mobile device, wherein at least one of the candidate applications in the mobile device includes a communication module for providing communication connection, selecting, based on application related information of the candidate applications, a target connected application from among the candidate applications in the mobile device, wherein the target connected application includes the communication module, and enabling the communication module of the target connected application so as to provide communication connection for the candidate applications in the mobile device, wherein the application-related information includes at least one of communication demand information of the candidate applications, communication protocol information of the communication modules of the candidate applications, and application classification information of the candidate applications, when the communication module of the target connected application is enabled, broadcasting an application connection message to candidate connected applications through the target connected application, wherein the candidate connected applications include candidate applications other than the target connected application among the candidate applications in the mobile device, and wherein said application connection message includes an application identification of the target connected application, receiving the application connection message through at least one of the candidate connected applications, and based on the application connection message, closing the communication module corresponding to at least one of the candidate connected applications, and wherein the candidate connected applications includes a first candidate connected application, wherein the method further comprises sending, by the first candidate connected application, a first application message to the target connected application based on the application identification of the target connected application, receiving, by the target connected application, the first application message sent from the first candidate application, and sending, by the communication module, the first application message to a corresponding communication end.

2. The method of claim 1, wherein the candidate connected applications comprise a first candidate connected application, and wherein the method further comprises broadcasting, by the first candidate connected application, a first application message to be sent to a corresponding communication end, receiving, by the target connected application, the first application message broadcast by the first candidate application, and sending, by the communication module, the first application message to the corresponding communication end.

3. The method of claim 1, wherein the first application message includes the application identification corresponding to the first candidate connected application, wherein receiving, by the target connected application, the first application message sent from the first candidate application, and sending, by the communication module, the first application message to a corresponding communication end further comprises extracting, by the target connected application, the application identification from the first application message, and determining a first candidate connected application corresponding to the application identification based on the application identification.

4. The method of claim 2, wherein the first application message includes the application identification corresponding to the first candidate connected application, wherein receiving, by the target connected application, the first application message sent from the first candidate application, and sending, by the communication module, the first application message to a corresponding communication end further comprises extracting, by the target connected application, the application identification from the first application message, and determining a first candidate connected application corresponding to the application identification based on the application identification.

5. The method of claim 3, wherein determining a first candidate connected application corresponding to the application identification based on the application identification comprises determining a first candidate connected application corresponding to the application identification based on the application identification in conjunction with application authorization information.

6. The method of claim 4, wherein determining a first candidate connected application corresponding to the application identification based on the application identification comprises determining a first candidate connected application corresponding to the application identification based on the application identification in conjunction with application authorization information.

7. The method of any one of claim 1, wherein receiving, by the target connected application, the first application message sent from the first candidate application, and sending, by the communication module, the first application message to a corresponding communication end further comprises encoding the first application message based on historical message transfer records between the target connected application and the corresponding communication end to reduce the data amount of the first application message, and sending, by the communication module the encoded first application message to the corresponding communication end.

8. The method of claim 1, wherein the candidate connected applications include a second candidate connected application, wherein receiving, by the target connected application, the first application message sent from the first candidate application, and sending, by the communication module, the first application message to a corresponding communication end further comprises receiving, by the target connected application, a second application message sent by the second candidate connected application, merging the first application message and the second application message to obtain a merged target application message, and sending the merged target application message to the corresponding communication end.

9. The method of claim 1, herein the candidate connected applications include a third candidate connected application, wherein the method further comprises receiving, by the target connected application, a service message sent by the corresponding communication end, wherein the service message includes the application identification of the third candidate application, and sending the service message to the third candidate application corresponding to the application identification based on the application identification.

10. The method of claim 1, wherein selecting, based on application related information of the candidate applications, a target connected application from among the candidate applications in the mobile device further comprises selecting a target connected application from among the candidate applications based on application related information of the candidate applications in conjunction with a predetermined threshold for the number of applications, wherein the target connected application comprises the communication module.

11. A manufacture comprising a non-transitory computer readable storage medium, said non-transitory computer readable storage medium comprising computer code that, when executed, causes execution of the method of claim 1.

12. An apparatus comprising a mobile device for providing a communication connection for candidate applications, wherein the mobile device comprises an application-obtaining module, an application-selecting module, and a communication-providing module, wherein the application-obtaining module is configured to obtain the candidate applications to be provided communication connection in the mobile device, wherein at least one of the candidate applications in the mobile device includes a communication module for providing communication connection, wherein the application-selecting module is configured to select, based on application related information of the candidate applications, a target connected application from among the candidate applications in the mobile device, wherein the target connected application includes the communication module, and wherein the communication-providing module is configured to enable the communication module of the target connected application so as to provide communication connection for the candidate applications in the mobile device, wherein the application-related information includes at least one of communication demand information of the candidate applications, communication protocol information of the communication modules of the candidate applications, and application classification information of the candidate applications, wherein the mobile device further comprises a module-scheduling module configured to, when the communication module of the target connected application is enabled, broadcast an application connection message to candidate connected applications through the target connected application, wherein the candidate connected applications include candidate applications other than the target connected application among the candidate applications, and said application connection message includes an application identification of the target connected application, to receive the application connection message through at least one of the candidate connected applications, and based on the application connection message, to close the communication module corresponding to at least one of the candidate connected applications, and wherein the candidate connected applications include a first candidate connected application, wherein the device further comprises an application message sending module configured to send, by the first candidate connected application, a first application message to the target connected application based on the application identification of the target connected application, and an application message forwarding module configured to receive, by the target connected application, the first application message sent from the first candidate application, and to send, by the communication module, the first application message to a corresponding communication end.

13. The apparatus of claim 12, wherein the candidate connected application comprise a first candidate connected application, wherein the device further comprises an application message broadcasting module configured to broadcast, by the first candidate connected application, a first application message to be sent to a corresponding communication end, and an application message forwarding module configured to receive, by the target connected application, the first application message broadcast by the first candidate application, and to send, by the communication module, the first application message to the corresponding communication end.

14. The apparatus of claim 13, wherein the first application message includes the application identification corresponding to the first candidate connected application, and wherein the application message forwarding module further comprises an identification extracting unit configured to extract, by the target connected application, the application identification from the first application message, and an application determining unit configured to determine a first candidate connected application corresponding to the application identification based on the application identification.

15. The apparatus of claim 13, wherein the first application message includes the application identification corresponding to the first candidate connected application, wherein the application message forwarding module further comprises an identification-extracting unit configured to extract, by the target connected application, the application identification from the first application message, and an application-determining unit configured to determine a first candidate connected application corresponding to the application identification based on the application identification.

16. The apparatus of claim 14, wherein the application determining unit is configured to determine a first candidate connected application corresponding to the application identification based on the application identification in conjunction with application authorization information.

17. The apparatus of claim 15, wherein the application determining unit is configured to determine a first candidate connected application corresponding to the application identification based on the application identification in conjunction with application authorization information.

18. The apparatus of claim 12, wherein the application message forwarding module is further configured to receive, by the target connected application, the first application message sent by the first candidate application, to encode the first application message based on historical message transfer records between the target connected application and the corresponding communication end, to reduce the data amount of the first application message, and to send, by the communication module, the encoded first application message to the corresponding communication end.

19. The apparatus of claim 12, wherein the candidate connected applications include a second candidate connected application, wherein the application message forwarding module is further configured to receive, by the target connected application, a second application message sent by the second candidate connected application, to merge the first application message and the second application message to obtain a merged target application message, and to send the merged target application message to the corresponding communication end.

20. The apparatus of claim 12, wherein the candidate connected applications include a third candidate connected application, wherein the device further comprises a service message receiving module and a service message forwarding module, wherein the service message receiving module is configured to receive, by the target connected application, a service message sent by the corresponding communication end, wherein the service message includes the application identification of the third candidate application, and wherein the service message forwarding module is configured to send the service message to the third candidate application corresponding to the application identification based on the application identification.

21. The apparatus of claim 12, wherein the application selecting module is configured to select a target connected application from among the candidate applications based on application-related information of the candidate applications in conjunction with a predetermined threshold for the number of applications, and wherein the target connected application comprises the communication module.

* * * * *